United States Patent [19]
DiCarlo

[11] Patent Number: 5,868,224
[45] Date of Patent: Feb. 9, 1999

[54] LUBRICANT FITTING ADAPTOR

[75] Inventor: Leonard J. DiCarlo, St. Louis, Mo.

[73] Assignee: McNeil (Ohio) Corporation, St. Paul, Minn.

[21] Appl. No.: 881,647

[22] Filed: Jun. 24, 1997

[51] Int. Cl.$^6$ ............................ F01M 11/04; F16N 21/02; F16N 21/04

[52] U.S. Cl. ...................................... 184/105.3; 251/149.4; 251/149.6; 285/94; 285/382; 141/346; 141/348; 141/382; 141/386

[58] Field of Search ............................... 184/105.2, 105.3; 251/149.4, 149.6; 285/94, 382; 141/346, 348, 349, 382, 383, 384, 386

[56] References Cited

U.S. PATENT DOCUMENTS

| | | |
|---|---|---|
| 1,342,678 | 6/1920 | Houghton . |
| 1,366,381 | 1/1921 | Gullborg et al. ..................... 184/105.2 |
| 1,383,306 | 7/1921 | Jacques . |
| 1,637,325 | 7/1927 | Jacques . |
| 2,704,678 | 3/1955 | Klein et al. . |
| 2,714,021 | 7/1955 | Froidevaux . |
| 2,862,732 | 12/1958 | Guillou . |
| 2,913,820 | 11/1959 | Barth . |
| 4,145,076 | 3/1979 | Snow ........................................ 285/94 |
| 4,195,812 | 4/1980 | Norcross . |
| 4,347,915 | 9/1982 | Cooper . |
| 4,728,076 | 3/1988 | Ganshorn et al. ................... 251/149.6 |
| 4,892,171 | 1/1990 | Scheindel . |

Primary Examiner—Christopher Verdier
Attorney, Agent, or Firm—Senniger, Powers, Leavitt & Roedel

[57] ABSTRACT

An adaptor for generally permanent coupling of a lubricant line to a lubricant fitting. The fitting has a base, a neck, a head, a lubricant passage, and a valve member biased toward a closed position. The adaptor comprises a body having a hole extending therethrough and an insert in the hole having a circular head and a thin-walled cylindrical extension extending from the head slidable in the hole. The extension defines a socket for receiving the head of the fitting on application of the body and insert to the fitting. The extension is radially inwardly deformable into interlocking engagement with the fitting. The head of the insert has a pin extending therefrom within the socket in the direction toward an inner end of the hole. The head includes a passage for flow of lubricant therethrough. The body is formed for connection thereto of a lubricant line and has a wedging formation in the hole for radially deforming the extension into tight sealing engagement with the head of the fitting on forcible movement of the insert in the body toward the inner end thereof. The pin enters the head of the fitting with movement of the insert and engages a valve member in the fitting to move it to an open position by engagement of the pin with the valve member for flow of lubricant through the fitting.

9 Claims, 1 Drawing Sheet

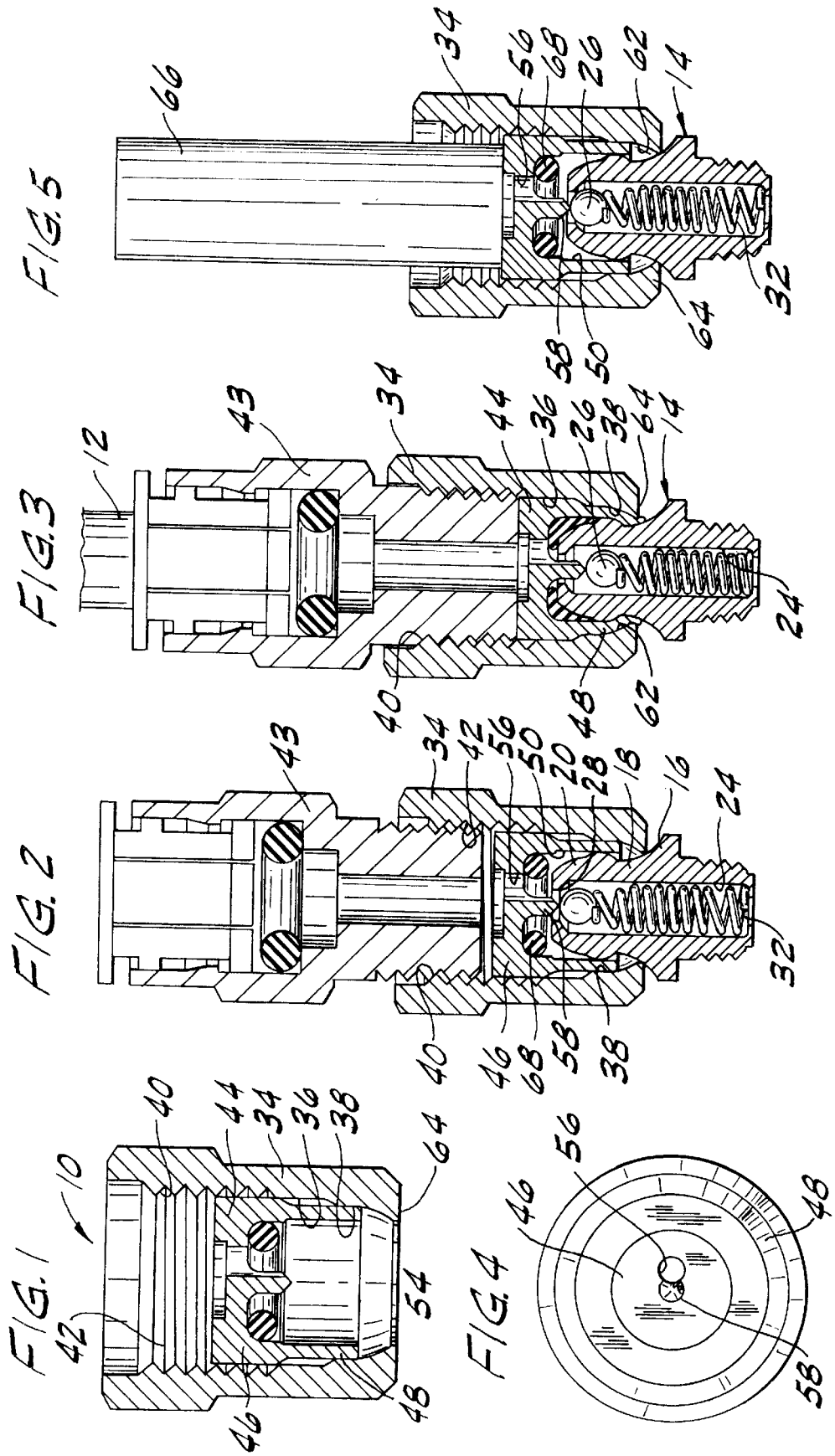

LUBRICANT FITTING ADAPTOR

BACKGROUND OF THE INVENTION

This invention relates generally to lubricant fittings and more particularly to an adaptor for attaching a lubricant line to a lubricant fitting. Installation of lubricant systems on equipment typically requires the removal of existing lubricant fittings for connection of lubricant delivery lines to the lubricant points. Since the lubricant fittings are typically press-in type fittings, removal is often difficult and time consuming. Moreover, if lubricant delivery lines are attached directly to the fittings, the pressure required to open a check valve in the fitting is typically about 450 psi, which creates a large pressure drop in the lubricant system.

Existing lubricant fitting adaptors are disclosed in U.S. Pat. Nos. 2,704,678 and 4,892,171. The adaptor of the U.S. Pat. No. 2,704,678, however, does not eliminate the pressure drop due to the check valve in the fitting as discussed above. Furthermore, the adaptor of the U.S. Pat. No. 4,892,171 is snap-fitted onto a lubricant fitting and does not provide adequate sealing between the lubricant fitting and adaptor.

Accordingly, there is presently a need for a lubricant fitting adaptor which allows for simple connection of a lubricant line to an existing lubricant fitting, provides adequate sealing between the lubricant fitting and adaptor and reduces the pressure drop through the lubricant fitting.

SUMMARY OF THE INVENTION

Among the several objects of this invention may be noted the provision of a lubricant fitting adaptor which allows for quick and easy attachment of a lubricant delivery line to an existing lubricant fitting; the provision of such an adaptor which opens a check valve of the lubricant fitting to reduce the pressure drop through the fitting; the provision of such an adaptor which has a minimal number of parts; and the provision of a lubricant fitting adaptor which is economical to manufacture.

Generally, an adaptor of this invention is for generally permanent coupling of a lubricant line to an already-in-place lubricant receiving fitting. The fitting comprises a base, a neck extending from the base, a head on the outer end of the neck and a lubricant passage extending through the base. The neck and the head have a valve seat at the end of the passage in the head. The fitting further comprises a valve member and means biasing the valve member toward a closed position engaging the seat. The adaptor comprises a body having a generally cylindric hole extending therethrough. One end of the hole constitutes its inner end and the other end constitutes its outer end. The adaptor further comprises an insert in the hole having a circular head and a relatively thin-walled cylindrical extension extending from the circular head generally coaxially therewith slidable in the hole with said circular head toward the outer end of the hole and the extension extending toward the inner end of the hole. The extension defines a socket for receiving the head of the in-place fitting on application of the body and insert to the in-place fitting. The extension is radially inwardly deformable into interlocking engagement with the in-place fitting under the head of the in-place fitting. The circular head of the insert has a pin extending therefrom within the socket in the direction toward the inner end of the hole and is passaged for flow of lubricant therethrough. The body is formed for connection thereto of a lubricant line for delivery of lubricant to the in-place fitting. The body has a wedge formation in the hole at the inner end of the body for radially deforming the extension into tight sealing engagement with the head of the in-place fitting on forcible movement of the insert in the body toward the inner end thereof. The pin enters the head of the in-place fitting on said movement and engages the valve member to move it to an open position by engagement of the pin with the valve member for flow of lubricant through the in-place fitting.

In a more specific aspect of the invention, the adaptor comprises an elongate nut one end of which constitutes its outer end and the other end of which constitutes its inner end having a hole extending therethrough from one end to the other. The nut has a screw thread in the hole toward the outer end of the nut for screw threading a fitting in the nut from its outer end for connection of the lubricant line thereto. The nut further has a tapered formation in the opening at the inner end of the nut. The tapered formation is convergent toward the inner end of the nut. The hole at the inner end of the nut is of somewhat larger diameter than the head of the in-place fitting. The adaptor further comprises the insert in the hole having the circular head and the relatively thin-walled cylindric extension projecting from the circular head coaxially therewith disposed in the hole in the nut with its circular head toward the outer end of the nut and its cylindric extension extending from the circular head in the direction toward the inner end of the nut. The insert has a sliding fit in the hole in the nut. The cylindric extension has an outer diameter smaller than the diameter of the hole at the inner end of the nut and an inside diameter slightly larger than the diameter of the head of the in-place fitting and defines a socket for receiving the head of the in-place fitting on application of the nut and insert to the in-place fitting. The cylindric extension is radially inwardly deformable into interlocking engagement with the in-place fitting under the head of the in-place fitting. The head of the insert has the pin extending therefrom within the socket in the direction toward the inner end of the nut generally coaxial with the nut and insert and having the port therein for flow of lubricant therethrough. The insert is forcibly slidable in the nut in the direction toward the inner end of the nut after application of the nut and insert to the in-place fitting with the neck of the in-place fitting extending into the hole in the nut at the inner end of the nut and with the head of the in-place fitting received in the socket in the insert to cause the thin-walled extension to be radially deformed inward by wedging action against the tapered formation into tight sealing and interlocking engagement with the head of the in-place fitting and also to cause the pin to move the valve member to an open position away from its seat and to hold it in the open position by engagement of the pin with the valve member for flow of lubricant through the in-place fitting.

Other objects and features will be in part apparent and in part pointed out hereinafter.

BRIEF DESCRIPTION OF THE PREFERRED EMBODIMENT

FIG. 1 is a cross-sectional view of an adaptor of the present invention;

FIG. 2 is a cross-sectional view of the adaptor of FIG. 1 in engagement with the lubricant fitting and a lubricant line connector;

FIG. 3 is cross-sectional view of the adaptor of FIG. 1 connected to the lubricant fitting and lubricant line connector;

FIG. 4 is a bottom view of the adaptor of FIG. 1; and

FIG. 5 is a cross-sectional view of the adaptor of FIG. 1 in engagement with the lubricant fitting and a staking tool placed within the adaptor for connecting the adaptor to the fitting.

DETAILED DESCRIPTION OF THE PREFERRED EMBODIMENTS

Referring first to FIG. 1, a lubricant fitting adaptor of this invention is generally indicated at 10. The adaptor 10 is used for generally permanent coupling of a lubricant line 12 to an already-in-place lubricant receiving fitting, generally indicated at 14 (FIGS. 2 and 3). The fitting 14 comprises a base 16, a neck 18, or undercut portion, extending from the base and a generally spheroidal head 20 on the outer end of the neck. The head 20 of the fitting is of generally flat truncated hemispherical form which converges spherically to the undercut portion 18. The fitting 14 has a longitudinal lubricant passage 24 extending through the base 16, the neck 18 and the head 20. A check valve 26 is disposed in the passageway for blocking flow therethrough. The check valve 26 is in the shape of a ball valve member engageable with a valve seat 28 at the end of the passage in the head 20. A spring 32 biases the ball 26 toward a closed position in which the ball engages the seat 28. The ball 26 is normally seated in a closed position to block the flow of lubricant and is normally opened by pressure exerted by the lubricant delivered from the lubricant line 12. It is to be understood that the check valve 26 may have configurations other than the one shown without departing from the scope of this invention.

The adaptor 10 comprises a body 34, or elongate nut, having a generally cylindric hole 36 extending therethrough (FIG. 1). The nut 34 has an inner end 38 for connection to the fitting 14 and an outer end 40 for connection thereto of the lubricant line 12 for delivery of lubricant to the fitting (FIGS. 2 and 3). The outer end 40 of the nut 34 has a screw thread 42 for screw threading a lubricant line connector 43 in the nut from its outer end for connection of the lubricant line 12 thereto. The inner end 38 of the nut 34 is sized for receiving an insert 44 for engagement with the fitting 14 and has a somewhat larger diameter than the head 20 of the fitting.

The insert 44 comprises a circular head 46 at one end and a relatively thin-walled cylindrical extension 48 extending from the circular head and generally coaxially therewith (FIG. 1). The extension 48 defines a generally cylindrical socket 50 for receiving the head 20 of the fitting 14 on application of the nut 34 and insert 44 to the fitting (FIG. 2). The extension 48 is radially deformable into interlocking engagement with the fitting 14 under the head 20 of the fitting (FIG. 3). The insert 44 is slidable in the hole 36 of the nut 34 with the circular head 46 toward the outer end 40 of the hole and the extension extending toward the inner end 38 of the hole. The extension 48 has an outer diameter smaller than the diameter of the hole 36 at the inner end 38 of the nut 34 and an inside diameter slightly larger than the diameter of the head 20 of the fitting 14. The internal diameter of the socket 50 and the diameter of the hole in the nut are slightly greater than the diameter of the head of a particular size of fitting to which the adaptor 10 is to be connected. The depth of the socket 50 is less than the internal diameter of the socket and somewhat greater than the distance from the flat end of the head 20 to the neck 18 of the fitting 14. The circular head 46 has a passageway 56 formed therein and a pin 58 extending therefrom in the direction toward the inner end 38 of the hole 36 (FIGS. 2 and 4). The pin 58 has a generally tapered end for engagement with the ball 26 to open the check valve and allow lubricant to flow therethrough. The pin 58 is preferably integrally formed with the insert 44. A sealing member, such as an O-ring 68 is disposed within the socket 50 of the insert 44 adjacent to the circular head 46. The O-ring 68 surrounds the pin 58 without blocking passageway 56.

The inner end 38 of the nut 34 is of spherical form and has a wedging or tapered formation 62 in the hole 36 at the inner end of the nut 34 (FIG. 3). The tapered formation 62 has an inwardly directed flange 64 at the outer end of the opening therein. The inside face of the flange 64 is spherically convergent in a direction toward the inner end 38 of the nut 34 for radially deforming the extension 48. The insert 44 is movable longitudinally relative to the nut 34 to deform the thin-walled extension 48 radially inward into tight sealing engagement with the neck 18 of the fitting 14 on forcible movement of the insert in the nut toward the inner end 38 thereof. The movement of the insert 44 also opens the check valve of the fitting 14 by engagement of the pin 58 with the ball valve member 26 which unseats the ball to allow flow through the passage 24 in the lubricant fitting 14.

In order to connect the lubricant line 12 to the fitting 14, the adaptor 10 is applied to the fitting with the head 20 of the fitting received in the socket 50 through the opening in the insert 44 (FIG. 2). The lubricant line connector 43 and the nut 34 are then forcibly screwed together to draw the nut onto the connector. As this occurs, the spherical inside face of the flange 64 of the nut 34, acting as a wedge, deforms the end of the thin-walled extension 48 of the insert 44 radially inwardly into tight sealing engagement with the neck 18, and the flat end of the head 20 is compressed against the sealing member 68 disposed within the insert 44 adjacent to the head 46 of the insert, with the result shown in FIG. 3. As the nut 34 is drawn onto the fitting 14, the pin 58 enters the head 20 of the fitting and engages the ball 26 to move it to its open position away from the valve seat 28. The pin 58 holds the check valve 26 in its open position for flow of lubricant through the fitting 14. This effects a permanent lubricant-tight attachment of the adaptor 10 to the fitting 14. The lubricant line 12 may then be readily connected to the lubricant line connector 43.

As shown in FIG. 5, a staking tool 66 may also be used to connect the adaptor 10 and fitting 14. The adaptor 10 is applied to the fitting 14 with the head 20 of the fitting received in the socket 50 of the insert 44. The staking tool 66 is received in the outer end 40 of the nut 34 and struck with a hammer or other suitable device so that the spherical inside face of the flange 64 of the nut 34 begins to deform the end of the thin-walled extension 48 of the insert 44 over the fitting 14 as described above. This holds adaptor 10 on fitting 14, easing assembly. The lubricant line connector 43 is then threaded into the nut 34 and tightened to complete the deformation of the thin-walled section 48 of the insert 44 over the fitting 14.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An adaptor for generally permanent coupling of a lubricant line to an already-in-place lubricant receiving fitting of the type comprising a base, a neck extending from the base, a head on the outer end of the neck, a lubricant passage extending through the base, the neck and the head with a valve seat at the end of the passage in the head, a valve member, and means biasing the valve member toward a closed position engaging the seat, said adaptor comprising:

a body having a generally cylindric hole extending therethrough, one end of said hole constituting its inner end and the other end constituting its outer end;

an insert in said hole having a circular head and a relatively thin-walled cylindrical extension extending from said circular head generally coaxially therewith slidable in said hole with said circular head toward said outer end of said hole and said extension extending toward the inner end of said hole;

said extension defining a socket for receiving the head of the in-place fitting on application of said body and insert to said in-place fitting, and being radially inwardly deformable into interlocking engagement with the in-place fitting under the head of the in-place fitting;

the circular head of the insert having a pin extending therefrom within said socket in the direction toward said inner end of said hole and being passaged for flow of lubricant therethrough;

said body being formed for connection thereto of said lubricant line for delivery of lubricant to the in-place fitting;

said body having a wedging formation in said hole at the inner end of the body for radially deforming said extension into tight sealing engagement with the head of the in-place fitting on forcible movement of the insert in the body toward said inner end thereof;

said pin entering the head of the in-place fitting on said movement and engaging the valve member to move it to an open position away from its seat and to hold it in the open position by engagement of said pin with said valve member for flow of lubricant through said in-place fitting.

2. An adaptor as set forth in claim 1 wherein said wedging formation comprises an inwardly directed flange at a first end thereof for engaging the thin-walled extension.

3. An adaptor as set forth in claim 1 wherein the body includes internal threads for engagement with the lubricant line connector.

4. An adaptor as set forth in claim 1 further comprising a sealing member disposed within said insert.

5. An adaptor as set forth in claim 1 wherein said pin is integrally formed with the thin-walled extension.

6. An adaptor for generally permanent coupling of a lubricant line to an already-in-place lubricant fitting of the type comprising a base, a neck extending from the base, a head on the outer end of the neck, a lubricant passage extending through the base, the neck and the head with a valve seat at the end of the passage in the head, a valve member, and means biasing the valve member toward a closed position engaging the seat, said adaptor comprising:

an elongate nut, one end of which constitutes its outer end and the other end of which constitutes its inner end having a hole extending therethrough from the one end to the other;

the nut having a screw thread in the hole toward the outer end of the nut for screw threading a fitting in the nut from its outer end for connection of the lubricant line thereto;

said nut further having a tapered formation in said opening at the inner end of the nut, said tapered formation being convergent toward said inner end of the nut;

the hole at the inner end of said nut being of somewhat larger diameter than the head of the in-place fitting;

an insert in the hole having a circular head and a relatively thin-walled cylindric extension projecting from said circular head coaxially therewith disposed in the hole in the nut with its said circular head toward the outer end of the nut and its said cylindric extension extending from said circular head in the direction toward the inner end of the nut;

said insert having a sliding fit in said hole in the nut;

said cylindric extension having an outer diameter smaller than the diameter of the hole at the inner end of the nut and an inside diameter slightly larger than the diameter of the head of the in-place fitting and defining a socket for receiving the head of the in-place fitting on application of the nut and insert to said in-line fitting and being radially inwardly deformable into interlocking engagement with the in-place fitting under the head of the in-place fitting;

the head of the insert having a pin extending therefrom within said socket in the direction toward the inner end of the nut generally coaxial with the nut and insert and having a port therein for flow of lubricant therethrough;

the insert being forcibly slidable in the nut in the direction toward the inner end of the nut after application of the nut and insert to the in-place fitting with the neck of the in-place fitting extending into the hole in the nut at the inner end of the nut and with the head of the in-place fitting received in the socket in the insert to cause the thin-walled extension to be radially deformed inward by wedging action against said tapered formation into tight sealing and interlocking engagement with the head of the in-place fitting and also to cause the pin to move the valve member to an open position away from its seat and to hold it in the open position by engagement of said pin with said valve member for flow of lubricant through said in-place fitting.

7. An adaptor as set forth in claim 6 wherein said tapered formation comprises an inwardly directed flange at a first end thereof for engaging the thin-walled extension.

8. An adaptor as set forth in claim 6 further comprising a sealing member disposed within said insert.

9. An adaptor as set forth in claim 6 wherein said pin is integrally formed with the thin-walled extension.

* * * * *